United States Patent
Culbertson et al.

[11] Patent Number: 5,885,668
[45] Date of Patent: Mar. 23, 1999

[54] PROCESS FOR SURFACE MODIFICATION OF AN LCP FILM

[75] Inventors: Edwin Charles Culbertson, Rock Hill; Randy Douglas Jester, Greer; John Arthur Penoyer, Greenville, all of S.C.

[73] Assignee: Hoechst Celanese Corporation, Somerville, N.J.

[21] Appl. No.: 852,752

[22] Filed: May 7, 1997

[51] Int. Cl.⁶ .................................................. G02F 1/1335
[52] U.S. Cl. ........................... 428/1; 427/370; 427/393.5; 427/536
[58] Field of Search ................................ 427/370, 393.5, 427/536; 428/1

[56] References Cited

U.S. PATENT DOCUMENTS

| | | |
|---|---|---|
| 4,476,189 | 10/1984 | Posey et al. . |
| 4,493,872 | 1/1985 | Funderburk et al. . |
| 4,525,419 | 6/1985 | Posey et al. . |
| 4,571,363 | 2/1986 | Culbertson et al. . |
| 4,585,687 | 4/1986 | Posey et al. . |
| 4,745,019 | 5/1988 | Posey et al. . |
| 5,227,115 | 7/1993 | Harnischfeger ...................... 427/165 X |
| 5,733,976 | 3/1998 | Sailet .................................. 428/447 X |
| 5,738,918 | 4/1998 | Shen et al. .................................. 428/1 |

*Primary Examiner*—Michael Lusignan
*Attorney, Agent, or Firm*—Burns, Doane, Swecker & Mathis, L.L.P.

[57] ABSTRACT

The surface of an aromatic liquid crystalline polyester film is modified to have improved adhesion by: (a) applying an adhesion-promoting coating to the film; (b) subsequently heating the film to a temperature above the melting point of the polyester; and, (c) applying pressure to the heated film. Preferably, the film is placed between two portions of a release film (e.g. a polyimide) prior to applying pressure.

20 Claims, No Drawings

5,885,668

PROCESS FOR SURFACE MODIFICATION OF AN LCP FILM

FIELD OF THE INVENTION

The present invention relates to the field of liquid crystalline polymer ("LCP") films, and processes for adhering LCP films to other materials.

BACKGROUND OF THE INVENTION

Compared to other polymer films, LCP films typically have high strength and modulus, and may also have other useful characteristics, e.g., low gas permeability and a low dielectric constant. For these reasons, it is desirable to bond an LCP film to another article or film. This makes it possible to form a laminate with another film. Furthermore, it may be desirable to coat an LCP film with another material to enhance its properties for certain applications. Preferably, the coating, article or film adheres well to the LCP film to avoid peeling or separating.

Ordinarily, adhesives can be used to bond two different materials or articles together. However, if one article or material does not form a strong bond with the adhesive, this procedure does not produce a good bond. LCP films usually do not adhere well to other materials, including many adhesive materials, due to the chemical and physical properties of the LCP. Therefore, it is difficult to bond such an LCP film to another film, to permanently coat the LCP film with a chemical layer, or to bond the LCP film onto an article.

SUMMARY OF THE INVENTION

The present invention provides a process for modifying the surface of an aromatic liquid crystalline polyester film, which is preferably an all-aromatic LCP polyester film. Optionally, the LCP film may have been treated first with a corona. The process comprises the steps of: (a) applying an adhesion-promoting coating to the film; (b) subsequently heating the film to a temperature above the melting point of the liquid crystalline polyester; and (c) applying pressure to the heated surface. Generally steps (b) and (c) are carried out at the same time. Preferably, the coated film is placed between two layers of a release film prior to applying pressure. After the pressing step, the release film may be peeled off the LCP film and an adhesive material may be applied to the coated surface.

It is an object of the present invention to provide a process for surface modifying LCP film to improve the film's adhesion to adhesive materials, as well as other materials, such as inks, release coatings, and abrasion resistant coatings.

It is another object of the present invention to provide a method for forming strong bonds between an LCP film and another article or film.

It is a further object of the present invention to provide a process for improving the adhesion of aromatic liquid crystalline polyester films.

Another object of the present invention is to provide a surface-modified LCP film having improved adhesion properties.

Other objects and advantages of the present invention will be apparent to those skilled in the art from the following description and the appended claims.

DETAILED DESCRIPTION OF THE PREFERRED EMBODIMENTS

In a preferred embodiment of the present invention, an adhesion-promoting coating is applied to a surface of an LCP polyester film, where the polyester comprises monomer units derived from 4-hydroxybenzoic acid and 6-hydroxy-2-naphthoic acid. Examples of such LCP polyesters include the VECTRA® family of LCP polymer resins, which are available from Hoechst Celanese Corporation, Summit, N.J. The VECTRA LCP polyesters generally include these two monomer units, and all of these LCP polyesters may be used in this invention. The preferred LCP polyesters consist essentially of monomer units derived from 4-hydroxybenzoic and 6-hydroxy-2-naphthoic acid and are sold in filled form as VECTRA A and C LCP polyester resins, and as an unfilled film under the VECTRAN® trademark. Other LCP polyesters may be used in this invention, and these will generally include monomer units derived from one or more of the following monomers, plus optionally other monomers: 4,4'-biphenol, 4,4'-biphenyldicarboxylic acid, 2,6-naphthalenedicarboxylic acid, 2,6-dihydroxynaphthalene, 6-hydroxy-2-naphthoic acid, 4-hydroxybenzoic acid, terephthalic acid, isophthalic acid, and hydroquinone.

The LCP may first be treated with a corona or a plasma to improve the surface wetting characteristics of the film. Corona treatment is more economical and can be carried out in air, and is thus preferred. The use of a corona-treated film is particularly advantageous for water based coatings. Corona treatment is less advantageous when the coating is in an organic solvent. Other methods of roughening the surface (e.g. chemical etching) may also be used to make the surface more readily wetted by water based coatings. The coated film is heated to a temperature above the melting point of the LCP polyester, typically about 1–20 degrees C. above the melting point, and preferably about 3–10 degrees C. above the melting point; this causes the polyester film surface to melt. The heated film is run through a press, e.g., a double belt press, or is pressed under a static press, in order to press the coating further into the molten surface of the film.

The film is generally subjected to pressure at the same time as it is heated rather than being heated first and pressed second. To prevent the film and the coating from sticking to the press, the coated film is preferably first placed between two layers of a release film which will not melt at the temperature and pressure used in the process, and which will not readily react with or bond to the LCP film or the coating during the process. Polyimide films (e.g. KAPTON® polyimide film) are particularly useful as the release film. Alternatively, the surfaces of the press that apply pressure may be coated with a release-type coating or a non-stick coating, such as a fluoroplymer.

After the hot pressing operation is completed, the release film layers are peeled off the LCP coated film. The LCP film is first cooled to a temperature below the melting point of the LCP (generally to ambient temperature) so that it solidifies before the release layer is removed. The film may be cooled by any suitable method, including exposure to ambient or refrigerated air, refrigeration, passing a cooling fluid over the surface, and other methods commonly used in the art. The pressing step may be accomplished by using any suitable pressing apparatus, including pressing the film between press members such as belts, plates, rolls, and the like, as well as combinations of these. A double belt press and a static press are particularly useful. It may be advantageous to use one or more heated press members to keep the LCP polyester above its melting point during the pressing operation. Suitable pressures that may be used in the practice of this invention are 25 to 7500 psi.

Suitable adhesion-promoting coating materials are generally polymers, such as acrylics, polyesters, polyimides, polyamides, polyurethanes, and the like. These polymers must be sufficiently thermally stable that they do not decompose under the conditions of the hot pressing step. Polymers that have functionalities that can transesterify with the ester groups of the LCP polyester appear to be particularly suited, such as carboxylic acid or ester groups, as are found in polyesters and acrylic polymers. Preferred examples include thermoplastic polyesters, such as the copolymer of isophthalic acid, ethylene gylcol, and 5-sulfoisophthalic acid, which adheres well to metal, as disclosed in U.S. Pat. No. 4,493,872. Related polyesters described in U.S. Pat. Nos. 4,476,189, 4,525,419, 4,571,363, 4,745,019, and 4,585,687 are also expected to be suitable in this invention. Acrylic polymers also have functional ester groups that make them useful as surface modifiers in this invention. Thermoplastic polyesters and crosslinkable acrylics were used in the examples, but it is expected that other polyesters and acrylics can be used equally well.

The adhesion-promoting coating materials are generally applied in the form of a solution or an aqueous dispersion (e.g. a latex) so that the coating material is present as a thin film. If an aqueous dispersion is applied, then it is preferred that the LCP film is first corona or plasma treated to improve wetting, with corona treatment being preferred. The solvent or water is then evaporated prior to the hot pressing step. These coating materials after the pressing step provide a surface that readily adheres to top coatings or adhesive coatings. This process thus produces an LCP film having a surface that is modified to better adhere to top coatings and adhesives.

The adhesion-promoted films can be adhesively bonded to other articles, including films, to form new and useful objects. Binding through the use of an adhesive is carried out by applying an adhesive to one of both of the surfaces that are to be bonded together, and then pressing the two surfaces together, where one surface is a surface of the surface-modified film and the other surface is a surface of the article. For example, an LCP film can be bonded to another film having different properties to provide a laminate having a desirable combination of the best properties of both films. For example, a polyolefin and LCP laminated film will have good gas-barrier properties due to the LCP, and will have a polyolefin surface suitable for writing, printing, or embossing.

The choice of an adhesive to bind the surface-modified LCP film to other articles or films is selected according to what adhesives bind to the surface-modified LCP film and to the other article or film. In general, the adhesive must bind well to both the surface-modifying polymer of the surface-modified LCP and to the other article or film. Such choices are readily made by pratictioners in the art. Many uses for the modified films produced by the process of the present invention will be apparent to those skilled in the art.

The following examples illustrate several embodiments of the present invention. However, the invention should not be construed as limited to the embodiments illustrated.

EXAMPLE 1

Corona-treated VECTRAN® 2 mil A-film aromatic liquid crystalline polyester film (made from VECTRA A LCP polyester, which consists essentially of monomer units derived from 4-hydroxybenzoic acid and 6-hydroxy-2-napthoic acid) was coated with a 45% aqueous dispersion of Rohm and Haas RHOPLEX™ AC-201 crosslinkable acrylic coating. The coating was dried in an oven for one minute at 100 degrees C. The coated film was then placed between two layers of a polyimide release film and placed into a double belt press, where it was heated under pressure to about 295° C., i.e. above the melting point of the LCP film. The film was cooled and removed, and the release layers were removed to yield a surface-modified LCP film.

The adhesion was evaluated using Rogers R-2005 adhesive to bind the surface treated LCP film to a polyimide film. The R-2005 adhesive is a standard adhesive for bonding metals to polyimides. The 90° peel strength was measured using a standard test method (described below) and was 382 gms/inch compared with 50 gms/inch for the unmodified LCP control.

The 90° peel strength determines how well a film adheres to another material, which may also be in the form of a film. The 90° peel strength test for two pieces of film laminated together is carried out on a one-inch wide piece of laminate. The ends of the films at one end of the laminate are separated and are placed in the jaws of a tensile tester. The film ends are pulled apart at a speed of 12 inches per minute. As they are pulled apart, the film ends are each at an angle of about 90° with respect to the laminate. The force required to peel the films apart, each at a 90° angle to the laminate, is measured in grams, and is reported as the 90° peel strength.

EXAMPLE 2

Corona-treated VECTRAN® LCP A-film (same as Example 1) was coated with a 10% aqueous dispersion of the thermoplastic polyester coating that is taught in U.S. Pat. No. 4,493,872. The coating was dried in an oven for one minute at 100 degrees C. The coated film was then placed between two layers of polyimide release film and placed into a double belt press under the same conditions as in Example 1. The film was removed and cooled, and the release layers were removed to yield a surface modified LCP film.

The adhesion was evaluated using Rogers R-2005 adhesive to bind the treated LCP film to polyimide film. The 90° peel strength was 560 gms versus 50 gms for the unmodified LCP control.

EXAMPLE 3

This example illustrates the effect of concentration and quantity of the adhesion-promoting coating on the adhesion properties of the modified LCP film. Corona-treated VECTRAN® film (same as in Example 1) was coated with a 45% aqueous dispersion of Rohm and Haas RHOPLEX™ AC-201 crosslinkable acrylic coating. Another aromatic liquid crystalline polyester film was coated with a 10% aqueous dispersion of the AC-201 acrylic coating. The coated films were dried in an oven for one minute at 100 degrees C. The coated films were then placed between layers of polyimide release film and placed into a double belt press under the same conditions as in Example 1. The films were cooled and removed, and the release layers were removed to yield a surface-modified LCP film.

The adhesion was evaluated using Rogers R-2005 adhesive to bind the treated films to polyimide film. The 90° peel strength was 587 gms for the 45% dispersion and 553 gms for the 10% dispersion. The peel strength of the control (untreated VECTRAN film) was 50 gms. Thus, the difference in concentrations in this example made little difference in the adhesion tests, indicating that there may be little dependence on the amount of adhesion-promoting coating as long as the necessary minimum amount is present.

Numerous variations of the present invention not illustrated herein will occur to one skilled in the art. The present invention is not limited to the embodiments illustrated and described herein, but encompasses all the subject matter within the scope of the appended claims.

We claim:

1. A process for modifying a surface of an aromatic liquid crystalline polyester film, comprising the steps of
   (a) applying an adhesion-promoting coating to at least one surface of said film;
   (b) subsequently heating said film to a temperature above the melting point of said polyester; and
   (c) applying pressure to said heated film to form a surface-modified LCP film.

2. The process according to claim 1, wherein said steps (b) and (c) are carried out at the same time.

3. The process according to claim 1, wherein said aromatic liquid crystalline film is corona-treated prior to said step (a).

4. The process according to claim 1, wherein said pressure is applied between two press members.

5. The process according to claim 4, wherein said press members are coated with a release coating or a non-stick coating.

6. The process according to claim 4, wherein said press members are selected from the group consisting of rolls, belts, plates, and combinations thereof.

7. The process according to claim 4, wherein said press members are belts in a double belt press.

8. The process according to claim 1, wherein said polyester comprises monomer units derived from 4-hydroxybenzoic acid and 6-hydroxy-2-naphthoic acid.

9. The process according to claim 8, wherein said aromatic liquid crystalline film is corona treated prior to step (a).

10. The process as recited in claim 1, wherein said adhesion-promoting coating is a polymer, selected from the group consisting of acrylics, polyesters, polyimides, polyurethanes, and polyamides.

11. The process as recited in claim 1, wherein said adhesion-promoting coating is selected from the group consisting of crosslinkable acrylics and thermoplastic polyesters.

12. The process as recited in claim 1, wherein said aromatic polyester comprises monomer units derived from 4-hydroxybenzoic acid and 6-hydroxy-2-naphthoic acid, and wherein said adhesion-promoting coating is selected from the group consisting of crosslinkable acrylics and thermoplastic polyesters.

13. A process for bonding an aromatic liquid crystalline polyester film to an article, comprising the steps of modifying the surface of said liquid crystalline polyester film as recited in claim 1, and then adhesively bonding said surface-modified LCP film to said article.

14. The process according to claim 13, wherein said surface-modified LCP film is cooled to a temperature below its melting point prior to said step of bonding said surface-modified film to said article.

15. The process as recited in claim 13, wherein said article is a film.

16. A surface-modified LCP film produced by a process according to claim 1.

17. A surface-modified LCP film produced by a process according to claim 8.

18. A surface-modified LCP film produced by a process according to claim 10.

19. An object comprising a surface-modified LCP film bonded to an article, wherein said object is made by the method of claim 13.

20. A laminate comprising a surface-modified LCP film bonded to a second film, wherein said laminate is made by the method recited in claim 15.

* * * * *